March 19, 1940.  C. J. KINZIE ET AL  2,194,426

ZIRCONIUM OXIDE AND METHOD OF MAKING SAME

Filed July 28, 1937

INVENTOR.
CHARLES J. KINZIE
DONALD S. HAKE
BY Philip B. Keck
ATTORNEY.

Patented Mar. 19, 1940

2,194,426

UNITED STATES PATENT OFFICE 2,194,426

ZIRCONIUM OXIDE AND METHOD OF MAKING SAME

Charles J. Kinzie and Donald S. Hake, Niagara Falls, N. Y., assignor to The Titanium Alloy Manufacturing Company, New York, N. Y., a corporation of Maine Application July 28, 1937, Serial No. 156,137

10 Claims. (Cl. 23—21)

This application is a continuation in part of our co-pending application for patent filed August 7, 1935, Serial No. 35,041, now U. S. Patent No. 2,143,013 of January 10, 1939.

Heretofore in the production of zirconium oxide, science has had to depend upon various relatively complicated chemical separations involving preliminary fusions of zircon with alkali and subsequent treatments with acid and various other later steps, such as crystallization, in order to separate the zirconium oxide from combined and other impurities such as silica which is combined with zirconia in the zircon ($ZrSiO_4$).

Other impurities such as iron, titanium, rare earth compounds, etc., have also been separated from the zirconium-containing materials only by relatively complicated procedures.

According to our improved methods the zirconium-containing material is at no stage brought into solution, and the raw zirconium material is not decomposed or altered through fusion or by other decomposing agents.

Our invention relates more particularly to the production of a new type of zirconium oxide in the form of a heretofore unknown low bulking crystalline zirconium oxide powder, in which one of its outstanding characteristics is the fact that the crystals are approximately twice as long as wide, and their thickness is considerably less than the width.

Approximately 80% of the crystals in our product range from 0.5 micron to 3 microns in length, while in the remaining 20% rarely is a crystal found having a length greater than 7 microns. Regardless of the length, the width is always less than the length and the crystal plates are all so thin that upon an examination in immersion oil under the microscope, the crystal plates lie flat on the glass and the thickness is thus not as easily determined as are the length and breadth.

We found, however, in all of our studies that the crystal plates were extremely thin, and it may be said that the thickness, in general ranges from about 0.40 micron as the probable minimum to 1 micron as the probable maximum thickness.

Our novel zirconium oxide of heretofore unknown dimensional crystal structure is also characterized as having an index of refraction somewhat higher than that of baddeleyite, referring either to natural baddeleyite or to the synthetic baddeleyite described in our U. S. Letters Patent No. 2,072,889 of March 9, 1937.

The maximum index of refraction determined for baddeleyite is 2.24 while our novel crystalline $ZrO_2$ form appears to have an index of refraction ranging from 2.3 to 2.4, when observed in suitable immersion media at magnification of about 1400X in a high power petrographic microscope. We also observed that birefringence of a fairly high order was a characteristic of this novel form of zirconium oxide, and since only crystalline materials have birefringence, the crystalline nature of this zirconium oxide is thereby established.

Another important novel characteristic of our novel zirconium oxide is the presence of an appreciable content of carbon, which, we believe is in the form of adsorbed carbon dioxide. This fact was unexpected, since microscopic studies showed us that the material was quite pure zirconia, and was also unusual in having a higher index of refraction than that found for baddeleyite. Spectographic analysis showed the material to be unusually pure, but such analysis as conducted would not show the presence of carbon, since carbon electrodes were used in producing the arc to vaporize the sample.

We also found that when a sample of this zirconium oxide is put through the process of determining carbon by the direct combustion method of heating a weighed sample in a stream of oxygen at about 1000° C., and then absorbing and weighing the carbon dioxide, the $CO_2$ was 0.366% of the weight of the sample.

When, however, one part by weight of this zirconium oxide was first mixed with two parts by weight of red lead ($Pb_3O_4$), and then put through the combustion carbon method, the $CO_2$ obtained was 1.64% of the sample.

By heating this zirconium oxide in vacuo at 900–1000° C. we found that a loss in weight occurs, and that when the adsorbed $CO_2$ gas released under vacuum is drawn through a $CO_2$ absorber, an increase in weight is recorded. However, only a minor part of the total is removed in this manner. By using a modified Plucker tube in the vacuum train and subjecting the gas to spectographic studies, we found that the gas was $CO_2$.

In addition to the above tests, we also found that in another experiment that the gases were released from this zirconia with aid of $Pb_3O_4$ at temperatures of 900–1000° C. and that water vapor was removed by absorption in anhydrons magnesium perchlorate. Such residual gases were analyzed spectrographically by means of spark discharge through a modified Plucker tube in the vacuum train.

The following lines corresponding to carbon dioxide are definitely measurable:

| | | |
|---|---|---|
| Band head at | $\lambda=4718$ | A. U. |
| Subsidiary band heads | $=4668$ | A. U. |
| | 4584 | A. U. |
| | 4558 | A. U. |
| | 4552 | A. U. |
| Band head at | $\lambda=3920.77$ } 3919.66 } | A. U. doublet |
| Subsidiary band heads | 3900 | A. U. |
| | 3898 | A. U. |
| | 3864 | A. U. |
| | 3860 | A. U. |

In this manner the identity of this gas fraction compared with $CO_2$ is established.

Based on the above experiments and tests we are led to believe that the content of carbon represented by the 1.64% determined $CO_2$ is actually present as tenaciously adsorbed carbon dioxide.

Although our experiments and tests indicate that the carbon present is at least in part present as adsorbed $CO_2$, we do not lose sight of the possibility that some colorless solid compound of zirconium and carbon may be present, which, if present, is not readily decomposed, since it would have to resist the heat of formation of the $ZrO_2$ from the zirconium carboxide, and also since subsequent treatments, such as heating in oxygen at 1000° C., failed to release only a small part of the carbon. Hence it was necessary to resort to the powerful flux, $Pb_3O_4$, with resultant conversion of the novel $ZrO_2$ to lead zirconate before the carbon was released.

Carbon forms many colorless as well as high colored compounds. While the element carbon exists in nature as colorless carbon, for example, diamonds, it also exists in black and intermediate colored forms as graphite and amorphous carbons.

However, based on the peculiar crystal size and form and structure of this unique and novel zirconium oxide, we know it to be a powerful adsorbent; again we believe that the carbon is present as adsorbed $CO_2$, which requires the alteration of the crystal form of the zirconia, or its conversion into another compound in order to release the carbon dioxide so tenaciously held.

The presence of this adsorbed $CO_2$ may explain the high index of refraction noted for our improved $ZrO_2$. Possibly the carbon is present at the surface of the crystals thereby resulting in a carbon compound rich exterior and so showing an appreciable increase of index of refraction.

Another sample of this type of zirconium oxide, when examined under the petrographic microscope, was found to be a zirconium oxide of high birefringence and of a high order as regards whiteness. The size of the particles varied from 0.5 to 15 microns in size. The material is crystalline as we found under the microscope. This fact of the observation of birefringence establishes the crystalline nature of the material, since birefringence is a characteristic only of crystalline materials.

The particles of our improved $ZrO_2$ are essentially all characterized by the fact that the length is greater than the breadth, and that the thickness is always less than the length or breadth when viewed at magnification of 1370X. The small particles as well as the large particles pass in and out of focus simultaneously over the entire field of the slide, and by focusing up and down by means of the fine adjustment (which is calibrated in terms of micron per uniit of graduation) we found that the grains are never more than 2 microns thick and that most of them are less than one micron thick. The crystals are wider than they are thick and longer than they are wide.

In short our improved zirconium oxide may be described as being a crystalline $ZrO_2$ of high birefringence with an index of refraction higher than that of baddeleyite, namely above 2.24. The crystals are in the form of thin plates which are longer than wide and also thinner than their width. The micron dimensions are in the range mainly from 1 to 15 microns long, from 0.5 to 8 microns wide, and their thickness of the order 0.4 micron to 1 micron, and are additionally characterized as being white of a high order at 1370X magnifications. They have a content of adsorbed $CO_2$ or colorless adsorption compound of a zirconium compound and a carbon compound, the carbon compound being evolved in the form of gaseous carbon gas in contact with a flux.

Therefore we have discovered a new form of zirconium oxide characterized as essentially white in color and consisting of crystals longer than their width and having their thickness less than width, and also with a content of adsorbed carbon gas.

Our novel $ZrO_2$ product is possessed of utilitarian properties of the order capable of producing novel articles, particularly in ceramics, and such usages and articles produced thereby are being made the subject of separate applications for patent.

The following novel feature of our new zirconium oxide product is presented by way of illustration to show that such zirconium oxide produces results in opacifying vitreous enamels heretofore unknown by us or to others experienced in the art of producing opacity in vitreous enamel coatings, so far as we have knowledge.

In the enamel tests in which our new zirconium oxide product was used 6 parts by weight along with 6 parts by weight enameling clay and ¼ parts by weight of magnesium carbonate to 100 parts by weight of enamel frit and the charge milled with 40 parts by weight of water to form the enamel slip and applied to ground coated iron base and fired, we found that the enamel consisted of a coating considerably increased in thickness due to action of the enamel (which is a powerful flux). Such result was undoubtedly due to the liberation of the adsorbed gas, or to the decomposition of the herein referred to colorless carbon compounds to form colorless gaseous carbon compounds which evolved within the viscous enamel at relatively high temperature (say 1500° F.), and so are entrapped and remain with the formation of a matrix of vitreous enamel in which are a multitude of gas pockets or perhaps better described as bubbles.

We also found that the opacity of this enamel was considerably higher than that of one of same frit with 6% mill added tin oxide.

We also found that a relatively small percentage of this new zirconium oxide was capable of producing an unheard of degree of opacity for such small mill addition, and to illustrate our discovery we offer the following experiment and test.

An enamel frit was prepared by mixing a batch of the following ingredients, all parts by weight:

| Ingredient | Parts |
|---|---|
| Feldspar | 35.72 |
| Quartz powder | 16.00 |
| Borax-hydrated | 32.80 |
| Sodium nitrate | 5.00 |
| Sodium carbonate | 7.57 |
| Cryolite | 6.00 |
| Antimony oxide | 2.70 |
| Fluorspar | 5.00 |
| Zinc oxide | 4.00 |
| Calcium carbonate | 1.54 |
| Titanium oxide | 4.00 |
| Sodium silico fluoride | 4.00 |
| | 124.33 |

This mix was smelted to a homogeneous melt, then poured into water to quench and produce the frit which was then dried and used in the following enamel experiments:

All the enamel specimens were prepared precisely by the following procedure in which we used the frit as prepared according to the foregoing formula.

The frit, clay, opacifier and magnesium carbonate were accurately weighed into porcelain jar mills containing porcelain balls, and water was added to each charge which was then milled in each case to a fineness of 12 grams residue +200 mesh from a 100 c. c. sample of slip.

The enameling was done on pieces of sheet enameling iron 6" x 4" size first enameled with a dark ground coat on both sides; the cover coat enamel under test was then applied in two coats. The first coat was first dried and fired for 2½ minutes at 1520° F., cooled, and then another coat applied, dried and fired at 1520° F. for 2½ minutes. The cover coat was applied in both coats to one side only of the 6" x 4" piece. The total weight of cover coat enamel was kept within the tolerance 11.90 to 12.10 grams per 6" x 4" surface. The opacity or reflectance was then determined by means of a reflectance meter.

The mill formulae for the series contained only one variable constituent, viz: the kind and amount of the opacifier. The formulae used throughout was:

| | |
|---|---|
| Frit—parts by weight | 100 |
| Enameler's clay—parts by weight | 6 |
| Magnesium carbonate—parts by weight | 0.25 |
| Opacifier—variable | |
| Water as required for milling to proper fineness about | 40 |

The following tabulation will list the opacifier additions and the reflectance results, reference being made to the U. S. Kinzie Letters Patent No. 2,102,627 of December 21, 1937.

| Enamel test, letter | Zirconium oxide of this case | Tin oxide, parts by weight | Example B—ZrO₂ roasted product described in Example B of said U. S. Letters Patent No. 2,102,627 | Reflectance reading of enamel |
|---|---|---|---|---|
| A | None | None | | 60.0 |
| B | 0.10 | None | | 61.6 |
| C | None | 0.10 | | 60.2 |
| D | 0.20 | None | | 63.0 |
| E | 0.30 | None | | 64.1 |
| F | 0.40 | None | | 65.2 |
| G | 0.50 | None | | 66.7 |
| H | None | 0.50 | | 61.9 |
| I | 1.00 | None | | 68.9 |
| J | 2.00 | None | | 69.3 |
| K | None | 2.00 | | 65.8 |
| L | 3.00 | None | | 71.7 |
| M | None | 4.00 | | 69.1 |
| N | None | 6.00 | | 72.1 |
| O | None | None | 0.10 | 60.1 |
| P | None | None | 0.50 | 61.6 |

Enamel A, as will be observed, contains no mill addition opacifier and has a reflectance of 60. In enamel C, 0.10 part tin oxide has practically no effect in increasing the reflectance, while as noted in Enamel H—0.50 part tin oxide only increased the reflectance from 60 of A to 61.9. On the other hand our novel zirconium oxide product imparted a regular increase in opacity. Based on these results it may be stated that in these lower percentages the zirconium oxide produces from three to four times as much increase in opacity as does tin oxide. Thus in enamel B—0.10 part of our new $ZrO_2$ produced practically as much opacity as compared with 0.50 part tin oxide in enamel H, while 0.20 part of our $ZrO_2$ in enamel D produced considerably more opacity as compared with the tin oxide of enamel H. Again enamel G with 0.50 part, this zirconium oxide has a higher opacity reading than did enamel K containing two parts by weight of tin oxide. Enamels O and P show that a high grade zirconium oxide opacifier, like tin oxide, has none of the properties of the $ZrO_2$ of this case.

When our novel zirconium oxide is used in amounts much above one part by weight to 100 parts by weight of frit, the enamel is definitely expanded and the surface, although having a good lustre, is of a texture entirely different as compared with that of a smooth enamel. The 2 parts and 3 parts by weight addition of our zirconium oxide produced a surface with considerable lustre, but it had a decidedly wrinkled texture. The additions of 1 part of this zirconium oxide produced an enamel of smooth texture, but with somewhat less lustre as compared with enamel A, while 0.50 part of zirconium oxide produced an enamel having a good lustre.

As a mill addition opacifier in vitreous enameling, therefore, our new $ZrO_2$ product possesses opacifying power unknown prior to the discovery of such zirconium oxide product, since relatively small amounts added at the mill produce opacifying to a degree heretofore unknown for any mill addition material.

Where high lustre smooth texture enamels are desired, the amount used should be kept below the point where the texture and lustre are materially effected, namely, in amounts of 1 part or less by weight to 100 parts frit. The textures produced by higher percentages may be of interest as special vitreous enamel finishes.

Our new zirconium oxide product may be of utility in producing porous vitreous structures such as for instance, a spongy porous enamel coating on the back of vitreous enameled iron tile to form a bonding surface, and so facilitate the cementing of the enameled sheet iron tile to a wall; also it might be applied to glass tile or to clay body tile.

Suitable raw materials for use in our process in producing this novel zirconium oxide product are practically any relatively pure low silica or silica-free zirconium oxide. For example, the electrically fused zirconium oxide of analysis described on page 2, lines 70–76 U. S. Patent No. 1,618,286 to Kinzie, except that by using a purer zircon as the starting material and continuing the fusion a little further an electrically fused $ZrO_2$ is possible. Such a product, when crushed and sieved to −35 mesh, would be a suitable starting $ZrO_2$.

The zirconium oxide described in Example No. 2 of U. S. Patent No. 1,494,426 to Kinzie could also be used, but produced from zirconium materials, which, in turn, are produced from now available pure zirconium silicates. By taking pains in the process to exclude the $SiO_2$, a relatively purer and suitable starting $ZrO_2$ for our purpose and methods would result.

Zirconium cyanonitride as well as zirconium carbide may also be used when produced in such manner as to have a silicon compound content practically nil. These compounds upon oxidation to $ZrO_2$ produce suitable starting zirconium oxides for our process.

Some of the above mentioned suitable starting zirconium oxides are relatively expensive, or are difficult to obtain consistently sufficiently free of silicon compounds, and, therefore, we prefer to use as the starting zirconium oxide the synthetic baddeleyite referred to in lines 3 to 15, page 3 of U. S. Patent No. 2,072,889 to Kinzie and Hake.

Again the uncalcined gray friable $ZrO_2$ product described on lines 73 to 75 of page 2, and on lines 1 and 2 of page 3 of our Patent No. 2,072,889 may also be used as the starting $ZrO_2$.

In the accompanying drawing showing a type of an electric resistance furnace in which our invention may be practiced—

Figure 1:
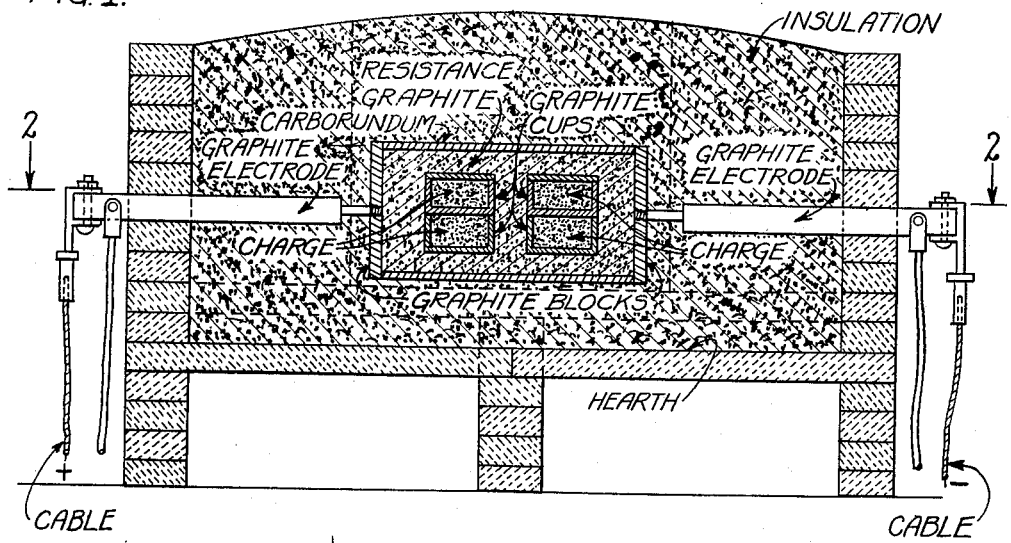
Fig. 1 is a sectional elevation of the furnace and its contents.
Figure 2:
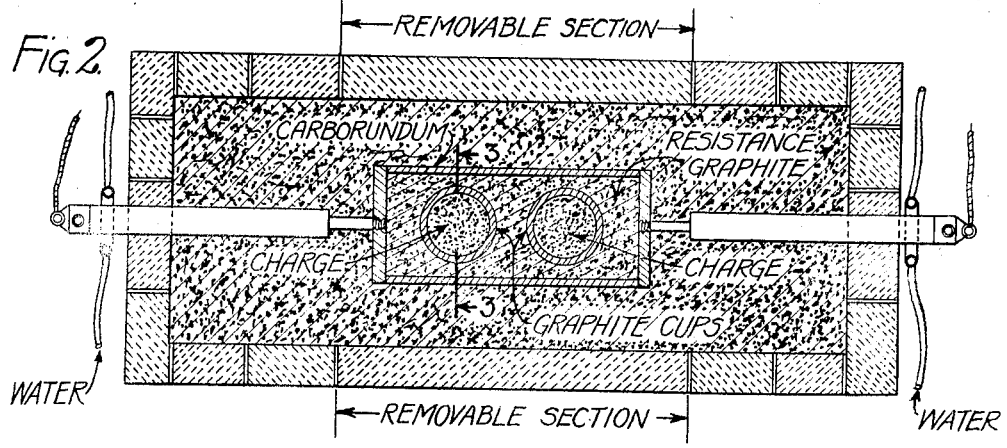
Fig. 2 is a section taken on the line 2—2 of Fig. 1.

Referring to these Figs. 1 and 2, the hearth of any suitable material is supported on piers, the hearth forming a supporting base for the furnace and its charge. Such base has also side and end walls to hold the charge. Through each of the end walls is a suitable opening for arranging the graphite electrodes, while the sidewalls of the furnace are built up of loose bricks to permit the free escape of evolved gases with cracks or openings also formed in the bottom which is raised for ample air circulation.

The following Example A will show how our methods are practiced in this furnace by which our novel and improved crystalline zirconium oxide is produced.

The furnace as shown was loaded in the following manner:

An insulating mix is first prepared by mixing the following materials

| | Parts by weight |
|---|---|
| Green petroleum coke | 37 |
| Silica sand | 55 |
| Wood sawdust | 8 |
| | 100 |

Other forms of carbon may be used in place of petroleum coke, such as coal or calcined coal in the form of foundry coke, if desired.

Silicon carbide may be used in the insulation mix, since we now find that the more silicon carbide present in the insulation mix the less is the carbon monoxide evolved. Again in cases where silicon carbide has been used for the entire insulation, very little carbon monoxide is evolved, since silicon carbide is stable at the temperatures in the insulation zone, whereas the insulation mix of coke, sand and sawdust reacts and shrinks to a considerable extent, particularly in zones close to the core. This shrinkage in volume of insulating mix must be compensated for by addition in proper proportions of new insulating material each time the furnace is set up. In contrast the silicon carbide insulation does not shrink and can be used over and over again with practically no addition of new silicon carbide.

This insulation is charged upon the furnace hearth to a depth of about ten inches and leveled off. The graphite electrodes consist preferably of round one inch by twenty-six long pieces, one through each end wall, the exterior ends being suitably connected to the source of current by cables (Figs. 1 and 2), while the inner ends are connected to two upright graphite blocks that are spaced twenty-six inches from each other. Between the graphite blocks around the core are placed, one-half inch layers of ⅛ inch silicon carbide particles to envelop the resistance core containing the charge to be treated.

Outside the furnace the ends of the graphite electrodes may be cooled by passing a current of water through them as shown in Figs. 1 and 2.

A charge was prepared by intimately mixing 905.1 grams of the calcined substantially pure crystalline $ZrO_2$ which we have described as a comparatively dense material having approximately the following composition:

| | Per cent |
|---|---|
| Silicon (calculated as $SiO_2$) | Nil |
| Titanium (calculated as $TiO_2$) | 0.14 |
| Iron (calculated as $Fe_2O_3$) less than | 0.005 |
| Balance zirconium oxide+ | 99.855 |
| | 100.000 | with 452.5 grams of petroleum coke. Both constituents of this mixture were crushed to form −35 mesh aggregates and thoroughly mixed.

The product mixed with coke may be the uncalcined product of our U. S. Letters Patent No. 2,072,889 that is a friable gray-colored mass crushed to −35 mesh with a carbon content of about 0.10 percent with the balance substantially zirconium oxide.

This well-mixed charge was loaded into four carbon cups or saggers, each being one and one-half inch deep and four inches in diameter, the cups being arrayed in spaced-apart pairs in the furnace as shown.

Figure 3:
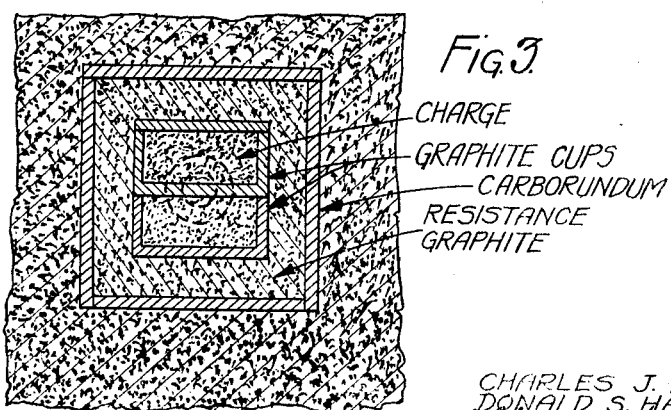
Fig. 3 is an enlarged section taken on the line 3—3 of Fig. 2.

The top cup superposed on the lower serves as a cover for the latter with the top cup covered by a graphite plate (Figs. 1 and 3).

The charge as so formed comprising the resistance core, the graphite cups containing the charge within the resistance carbon core, but not a part thereof, is completely surrounded at the bottom, sides, top and ends with approximately twelve inch zones of this insulating charge. The source of power for this example was a laboratory transformer 20 K. V. A. with a secondary voltage range of 20 to 80 volts in steps of 2 volts. A voltmeter and an ammeter were connected and used to measure terminal voltage and secondary current.

The run was started at 9:40 a. m. and was completed at 3:00 p. m. on the same day. At the beginning the voltage was 39 but dropped to between 22 and 26 volts by noon and remained in the range of 22 to 25 volts during the balance of the run.

As the run progressed, the carbon monoxide gas evolved was ignited at various points at the sides, ends and bottom of the furnace. The exterior of the furnace bottom hearth, side walls, or top of the insulating mix were never much above room temperature, since the warmth at these points was mainly the result of the burning of carbon monoxide or other gases purposely ignited from the outside so as to convert same into harmless gases.

The amperage was 112 at the start, 720 by noon and remained within the range of 600 to 783 throughout the balance of the run. The power was turned off at 3 p. m., and the furnace allowed to cool for about 72 hours and then unloaded.

The four cups or saggers contained 921.3 grams of dark gray granular material which we found upon analysis to have approximately the following composition:

|  | Percent |
|---|---|
| Zirconium, calculated at Zr | 72.69 |
| Titanium, calculated as Ti | 0.10 |
| Iron, calculated as Fe | 0.01 |
| Silicon, calculated as Si | 0.13 |
| Carbon, calculated as C | 19.81 |
| Oxygen | 7.26 |
|  | 100.00 |

The small silicon content is derived from the coke used in the mix.

*Example B.*—We have found that the capacity of the graphite cups or saggers can be increased by first forming the charge by pressing into briquettes of size to fit the cups. By this means the charge is compressed and thus more can be loaded into a furnace.

A charge is made up in the following proportions:

|  | Parts by weight |
|---|---|
| Synthetic baddeleyite —35 mesh | 100 |
| —80 mesh petroleum coke | 36 |
| Fuel oil | 2 |
| Total | 138 |

The charge is mixed and was then pressed in a hydraulic press in mold to form briquettes of size to fit the saggers referred to in the annexed drawing.

The total weight of charge thus possible by briquetting was 2050 grams for the four saggers as compared with 1397.6 grams when simply mixed and charged loose as in Example A.

The insulation in this Example B consisted only of +40 mesh silicon carbide.

Instead of the 20 k. v. a. transformer used as source of power in Example A the furnace for Example B was connected to a 400 k. v. a. and a power load of 20 kilowatts was maintained for 1 hour and 50 minutes. Power input was 45 kilowatt hours. Starting the furnace at 110 volts we finished off at 50 volts secondary.

The furnace gassed a little for 30 minutes, and very little gas was evolved due to use of silicon carbide insulation.

The product obtained was in the form of a dark gray friable slightly sintered material that was easily reduced to granular form by simple crushing.

The composition of this product was approximately:

|  | Percent |
|---|---|
| Zirconium | 81.00 |
| Carbon | 12.99 |
| Oxygen | 6.01 |
|  | 100.00 |

Weight of product was 1183 grams.

The proportions of zirconia to carbon in Example B are close to the proper proportions to yield zirconium carboxide essentially free of free carbon. Example A zirconium carboxide undoubtedly contains some free carbon.

Microscopically the product of both Examples A and B is an optically opaque homogeneous substance that fails to show evidence of presence of $ZrO_2$, and which is manifestly some compound in which zirconium, carbon and oxygen are combined. This compound when heated in contact with air or oxygen expands several times in volume.

In order to produce our novel zirconium oxide product, this zirconium-carbon-oxygen complex (zirconium carboxide) must be calcined in a certain manner. We have found, for instance, that oxidation in a thick layer does not produce the desired product due to the fact that in a thick mass the temperature becomes so high due to oxidation heat that the properties of the oxide product are altered. We have found that very thin layer ignition is necessary or some equivalent technique which prevents the oxide once formed from reaching so high a temperature as to shrink the $ZrO_2$ and destroy the desirable properties. Suitable oxidation conditions are, for example, as follows—

We first reduce the material to —40 mesh granular product which can be done by suitable crushing. We then spread the zirconium-carbon-oxygen complex onto a suitable refractory surface in a layer $\frac{1}{16}$" deep and heat at 900° C. until completely oxidized to a white powder of the following composition:

|  | Per cent |
|---|---|
| Zirconium oxide ($ZrO_2$) | 97.85 |
| Titanium oxide ($TiO_2$) | 0.10 to nil |
| Silicon oxide ($SiO_2$) | 0.10 to nil |
| Silicon carbide (SiC) | Trace to nil |
| Carbon dioxide ($CO_2$) | 1.64 |
| Iron oxide ($Fe_2O_3$) | 0.01 |
| Others | 0.30 |
|  | 100.00 |

The novel structure of this zirconium oxide product result in a heretofore unknown low weight per cu. ft., as will be observed in the following tabulation, which gives the weight per cu. ft. of zirconium oxides of Examples A and B—as obtained by oxidation of the novel zirconium-carbon-oxygen complex, but with no further treatment after oxidation. The weights per cu. ft. of the other zirconium oxides referred to in this tabulation are for products which have been subjected to fine wet milling in ball mills for protracted periods of time, and then dried and dried cake disintegrated to powder. The unmilled products would weigh more than the milled; for instance, electrically fused $ZrO_2$ crushed to ¼″ size has a weight per cu. ft. of about 210 pounds, while a cu.-ft. mass of electrically fused $ZrO_2$ would weigh considerably more than 210 pounds per cu. ft. Zirconium oxide obtained by oxidation of either zirconium cyanonitride or zirconium carbide before milling would weigh from 100 to 120 pounds per cu. ft.

*Tabulation*

Zirconium oxide_____ Weight per cu. ft.
Example A_____ 38 pounds
Example B_____ 34½ pounds
Obtained by oxidation of zirconium
    cyanonitride or carbide_____ 83 to 100 lbs.
Electrically fused zirconium oxide__ 170 pounds
Synthetic Baddeleyite of U. S. Patent
    2,072,889_____ 145 pounds Due to the heretofore unknown crystalline structure for zirconia, the product we have found when in powder form has a low weight per cu. ft., that is to say, it is a low bulking product. Hence in applications in which the adsorptive properties of this $ZrO_2$ are to be applied, for instance, in catalytic work, it is possible to fabricate shapes of our novel zirconia having low weight and relatively great surface exposure in the porous mass and still use relatively little zirconia.

We claim as our invention:

1. The method of making a crystalline zirconium oxide having an adsorbed carbon dioxide content and of low bulking weight from a dense, substantially pure zirconium oxide substantially free from silica, which comprises heating a mixture of said dense zirconium oxide and carbon enveloped in a resistance mix containing carbon acting as the resistor in an electric resistance furnace without fusion, but with substantial decomposition to form a zirconium-carbon-oxygen intermediate, and then calcining said intermediate in a thin layer at about 900° C. to oxidize and expand same to form said crystalline zirconium oxide without substantial shrinkage of extremely fine and uniform particle size more than 97% $ZrO_2$ and containing about 0.10% titanium oxide and about 0.01% iron oxide and also having an adsorbed carbon content with an index of refraction of about 2.3 to 2.4.

2. The method of making a crystalline zirconium oxide having an adsorbed carbon dioxide content and of low bulking weight from a calcined, dense and substantially pure zirconium oxide substantially free from silica, which comprises heating a mixture of said dense zirconium oxide and carbon enveloped in a resistance mix containing carbon acting as the resistor in an electric resistance furnace without fusion, but with substantial decomposition to form a zirconium-carbon-oxygen intermediate, and then calcining said intermediate in a thin layer at about 900° C. to oxidize and expand same to form said crystalline zirconium oxide without substantial shrinkage of extremely fine and uniform particle size containing more than 97% $ZrO_2$ about 0.10% titanium oxide and about 0.01% iron oxide and also having an adsorbed carbon content with an index of refraction of about 2.3 to 2.4.

3. The method of making a crystalline zirconium oxide having an adsorbed carbon dioxide content and of low bulking weight from a dense, substantially pure zirconium oxide substantially free from silica, which comprises heating a mixture of said dense zirconium oxide and carbon enveloped in resistance graphite acting as the resistor in an electric resistance furnace without fusion, but with substantial decomposition to form a zirconium-carbon-oxygen intermediate, and then calcining said intermediate in a thin layer at about 900° C. to oxidize and expand same to form said crystalline zirconium oxide without substantial shrinkage of extremely fine and uniform particle size more than 97% $ZrO_2$ and containing about 0.10% titanium oxide and about 0.01% iron oxide and also having an adsorbed carbon content with an index of refraction of about 2.3 to 2.4.

4. The method of making a crystalline zirconium oxide having an adsorbed carbon dioxide content and of low bulking weight from a friable, uncalcined gray-colored zirconium compound with 0.10% carbon content and the balance substantially zirconium oxide, which comprises heating a mixture of said zirconium compound and carbon enveloped in a resistance mix containing carbon acting as the resistor in an electric furnace without fusion, but with substantial decomposition to form a zirconium-carbon-oxygen intermediate, and then calcining said intermediate in a thin layer of about 1/16 inch deep at about 900° C. to oxidize and expand same to form said crystalline zirconium oxide without substantial shrinkage of extremely fine and uniform particle size more than 97% $ZrO_2$ and containing about 0.10% titanium oxide and about 0.01% iron oxide and also having an adsorbed carbon content with an index of refraction of about 2.3 to 2.4.

5. The method of making a crystalline zirconium oxide having an adsorbed carbon dioxide content and of low bulking weight from a dense, substantially pure zirconium oxide substantially free from silica, which comprises briquetting and then heating a mixture of said dense zirconium oxide and carbon enveloped in a resistance mix containing carbon acting as the resistor in an electric resistance furnace without fusion, but with substantial decomposition to form a zirconium-carbon-oxygen intermediate, and then calcining said intermediate to oxidize and expand same to form said crystalline zirconium oxide of extremely fine and uniform particle size more than 97% $ZrO_2$ and containing about 0.10% titanium oxide and about 0.01% iron oxide and also having an adsorbed carbon content with an index of refraction of about 2.3 to 2.4.

6. The method of making a crystalline zirconium oxide having an adsorbed carbon dioxide content and of low bulking weight from a calcined, dense and substantially pure zirconium oxide substantially free from silica, which comprises briquetting and then heating a mixture of said dense zirconium oxide and carbon enveloped in a resistance mix containing carbon acting as the resistor in an electric resistance furnace without fusion, but with substantial decomposition to form a zirconium-carbon-oxygen intermediate, and then calcining said intermediate in a thin layer of about 1/16 inch deep and about 900° C. to oxidize and expand same to form said crystalline zirconium oxide without substantial shrinkage of extremely fine and uniform particle size more than 97% $ZrO_2$ and containing about 0.10% titanium oxide and about 0.01% iron oxide and also having an adsorbed carbon content with an index of refraction of about 2.3 to 2.4.

7. The method of making a crystalline zirconium oxide having an adsorbed carbon dioxide content and of low bulking weight from a dense, substantially pure zirconium oxide substantially free from silica, which comprises briquetting and then heating a mixture of said dense zirconium oxide and carbon enveloped in resistance graphite acting as the resistor in an electric resistance furnace without fusion, but with substantial decomposition to form a zirconium-carbon-oxygen intermediate, and then calcining said intermediate to oxidize and expand same to form said crystalline zirconium oxide without substantial shrinkage of extremely fine and uniform particle size more than 97% $ZrO_2$ and containing about 0.10% titanium oxide and about 0.01% iron oxide and also having an adsorbed carbon content with an index of refraction of about 2.3 to 2.4.

8. A crystalline zirconium oxide compound obtained by the calcination of a zirconium-oxygen-carbon compound without substantial grinding of the calcined product characterized as an essentially white powder and of particle sizes within the range of 0.5 to 7 microns and of greater length than width, an index of refraction of about 2.3 to 2.4 and of less thickness than their width, and also having an adsorbed carbon dioxide content.

9. A crystalline zirconium oxide compound obtained by the calcination of a zirconium-oxygen-carbon compound without substantial grinding of the calcined product and characterized as an essentially white powder of high birefringence and of particle sizes within the range of 0.5 to 15 microns and of greater length than width and of less thickness than their width, an index of refraction of about 2.3 to 2.4 and also having an adsorbed carbon dioxide content.

10. A crystalline zirconium oxide obtained by the calcination of a zirconium-oxygen-carbon compound without substantial grinding of the calcined product characterized as an essentially white powder and characterized as being essentially white in color and consisting of crystal particles having their length greater than their width and their thickness less than their width, an index of refraction of about 2.3 to 2.4 and an adsorbed colorless carbon content of about a stoichiometric equivalent of 1.64% carbon dioxide.

CHARLES J. KINZIE.
DONALD S. HAKE.